United States Patent [19]

Johnson

[11] 4,022,820

[45] May 10, 1977

[54] SOLIDIFICATION AND CRYSTALLIZATION OF MATERIALS

[75] Inventor: Anders A. Johnson, Akron, Ohio

[73] Assignee: Monsanto Company, St. Louis, Mo.

[22] Filed: Nov. 12, 1974

[21] Appl. No.: 523,094

[52] U.S. Cl. .......................... 260/475 B; 260/707; 528/502; 23/273 R
[51] Int. Cl.² ........................................ C07C 69/76
[58] Field of Search ........... 260/475 B, 707, 96 PC; 528/502

[56] References Cited

UNITED STATES PATENTS 3,251,428  5/1966  Tabler .......................... 260/707 X

*Primary Examiner*—Anton H. Sutto
*Attorney, Agent, or Firm*—Robert E. Wexler

[57] ABSTRACT

Liquid materials which are difficult to crystallize and which may be subject to supercooling are solidified and crystallized by contacting the liquid material with an agitated, fluidized bed of solid particles of the same material. The bed of solid particles is agitated by means of a mechanical agitator and a current of fluidizing and cooling gas which enters the bottom portion of the bed vertically but is baffled toward the periphery of the bed.

32 Claims, 2 Drawing Figures

SOLIDIFICATION AND CRYSTALLIZATION OF MATERIALS

FIELD OF THE INVENTION

This invention relates to the solidification and crystallization of liquid materials which are different to crystallize and which may be subject to supercooling. The invention was developed as a result of the nature of certain liquid materials which supercool below their normal melting points during solidification and, accordingly, take many hours or days to solidify and then must be broken up mechanically.

DESCRIPTION OF PRIOR ART

It is known that liquid materials, both organic and inorganic, which are difficult to solidify may be prepared in a molten condition and then allowed to harden in various types of receptacles over a lengthy period of time. After hardening, the material is commonly broken up by mechanical means then crushed or ground to a suitable condition.

It is further known, in accordance with U.S. Pat. No. 3,549,731, that resin particles may be produced from molten resin in a more advantageous manner by atomizing the molten resin by mechanical or gas stream means into small discrete particles which are then cooled by a gas stream which has a temperature lower than the molten resin temperature. In such a procedure, the molten resin is introduced into the top of a mixing apparatus wherein the resin is atomized and cooled and the resulting solid particles fall to the bottom of the apparatus and are removed.

The dispersion of the molten material is principally accomplished by two methods. In one method, the molten material flows downwardly into the apparatus and directly contacts propeller blades which rotate about a vertical axis within the apparatus. At the same time, a cooling gas stream is directed upwards from below the propeller or is directed horizontally at the level of the propeller blades. Another means for dispensing the material is by directing the flow of molten material in a horizontal direction where it impinges on a downwardly directed high velocity gas stream which atomizes and serves to harden the molten material. At the same time, however, the molten material may also be contacted by an upwardly flowing gas stream. The size of the particles which are produced are said to a function of the pitch of the propeller blades within the apparatus.

SUMMARY OF THE INVENTION

The process of the invention is achieved by the use of an agitated fluidized crystallizer (AFC). The AFC is a unit designed to crystallize and solidify normally solid materials from the liquid state by employing a combination of heat transfer to remove heat of crystallization and shear which promotes crystallization. The AFC is a vertical cylindrical tank containing a bed of solid particles of a material which is to be crystallized from the liquid, i.e., dissolved or molten, state. The solid particles of the material rest on a support within the tank. Through this support, a fluidizing gas is blown upwardly to fluidize the bed and to remove heat of crystallization from the liquid material. The bed is agitated by a vertical agitator which extends into the bed from the top of the vessel. The liquid feed is pumped into the vessel from a storage tank which may be heated. The feed material is pumped onto the top of the agitated solids bed. On entering the bed, the feed is rapidly dispersed by the dynamic action of the bed and the solid particles in the bed are coated therewith. Some of the particles are broken down into smaller particles which are subsquently coated by the liquid material. As new particles are formed, the level of the bed rises and the solid product overflows from the side of the vessel. The product, as it leaves the vessel, is at an ambient temperature of approximately 26° C. to about 38° C.

The agitator within the tank moves the solid bed particles which create sufficient shear to disperse the liquid feed materials entering the tank. The shear which is created to disperse the liquid material entering the solid, particulate bed is the result of the bed particles shearing against each other rather than any action produced by the liquid material directly contacting the agitator. As the bed particles are coated by the liquid material they are rapidly sheared by surrounding particles. The dynamics of the bed are such that there is an angular velocity gradient across the radius of the bed with the slowest moving particles being along the outer wall and the fastest moving particles at or near the axis of the agitator.

Below the agitator and resting on the bed support there is a plenum baffle which disperses fluidizing gas entering the bottom of the AFC. This baffle disperses the gas to the circumference of the AFC vessel, i.e. to the periphery of the fluidized bed. This prevents channeling of air through the center of the bed and around the agitator shaft so as to enhance agitation and prevent vortexing of the bed.

The process of the invention and the apparatus therefor are described in the following figures.

Figure 1:
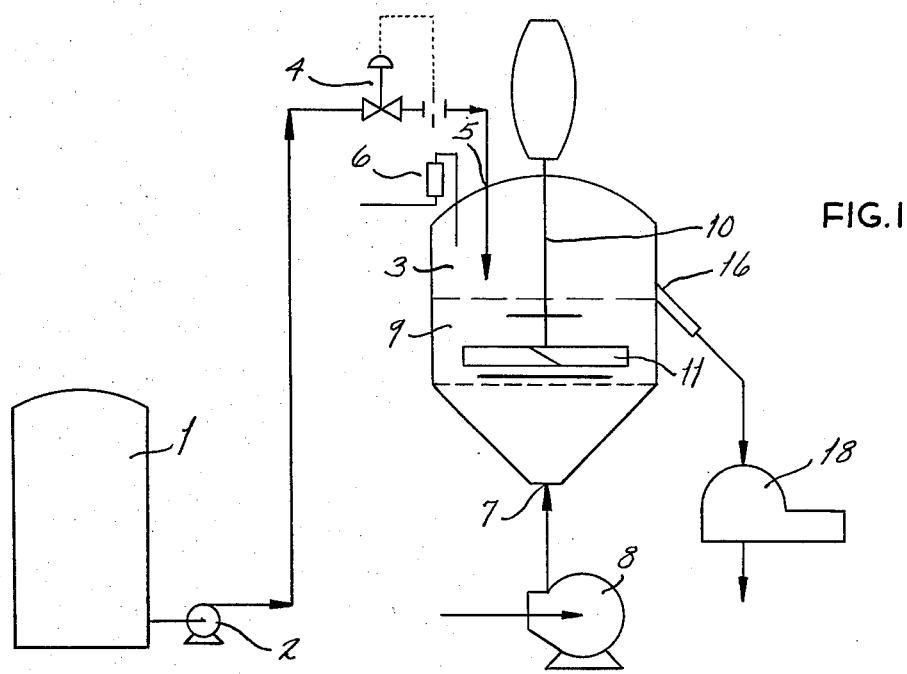
FIG. 1 is a schematic diagram of the process including a vertical section view of the AFC.

The process of the invention and the apparatus therefor in its preferred embodiments are described in greater detail hereinafter.

PREFERRED EMBODIMENTS

The Process

In the preferred embodiment of the process of this invention, the liquid material which is to be crystallized is introduced in liquid, e.g. molten, form into the top of the AFC tank.

The materials which are amenable to the process of the present invention are those materials which are difficult to crystallize, including those which may supercool upon solidification and, accordingly, take a lengthy time to solidify. Supercooling involves the phenomenon of cooling below the freezing point of a liquid without the separation of solid matter. Exemplary materials which are amenable to processing by the present invention include thermoplastic polymers such as polyolefins, e.g. polyethylene, polypropylene, and the like and esters of dicarboxylic acids such as diesters of aromatic acids, particularly diesters of phthalic acid. Particularly amenable to the process of the present invention are dicycloalkyl and diaromatic esters of dicarboxylic acids, particularly of phthalic acid, such as dicyclohexyl phthalate and diphenyl phthalate.

Upon entering the AFC, the liquid material, for example, dicyclohexyl phthalate (DCHP), contacts and is rapidly dispersed by a fluidized agitated bed of solid particles within the AFC to flow in a fluidic manner. The flow of the solid particles is charcterized by intense shearing action due to the high rate of collision of the solid bed particles with each other. The entering liquid material is rapidly dispersed by the action of the bed and some of the solid particles within the bed are coated while others are broken into smaller particles and are subsequently coated.

Fluidization of the bed and heat transfer therein is accomplished by blowing a gas, which may be at ambient temperature or below, through the starting bed of particles, e.g., DHCP pellets. The maximum desirable temperature rise of the fluidizing gas within the AFC, with regard to DCHP, has been determined to be within a range from about 4° C to about 19° C. Preferably, the maximum temperature rise of the fluidized gas, regarding DCHP, is from about 7° C. to about 15° C. Inparticular, the maximum desirable temperature rise of the fluidizing gas is from about 10° C. to about 13° C. In this manner, the heat transfer surface is a fluid to which there is no possibility of viscous attachment or fouling. Enhance improvement is thereby over units wherein heat transfer is across a solid cooling surface. The heat transfer within the bed is extremely rapid by virtue of the fact that as liquid material, e.g. molten DCHP, is introduced into the starting bed, the particles are coated by a thin shell of the melt which readily releases heat. Additionally, agitation of the bed promotes intimate contact of the particles among themselves, with the feed, and with the fluidizing and cooling gas. The maximum temperature rise of the fluidizing gas is variable, depending on the particular liquid material which is being treated and the particular fluidizing gas being used. In general, the fluidizing gas flow rate must be sufficient to both fluidize the bed and remove the heat of the process. The heat of the process is derived from the specific heat and the heat of crystallization of the molten feed material and any mechanical or radiant heat input from external sources. The heat of the process must be removed at a sufficient rate to permit complete crystallization of the material to avoid slurrying and agglomeration of bed particles.

A modification which may assist heat transfer is the utilization of a high vapor pressure material which is introduced into the bed. The use of a high vapor pressure material, such as water, dry ice, liquid nitrogen, liquid carbon dioxide, fluorinated hydrocarbons and common organic solvent such as aromatic and aliphatic hydrocarbons and oxygen-containing materials, e.g. benzene, toluene, hexane, heptane, octane, acetone, methyl ethyl ketone, ethers, dioxane and the like, allow the absorption of significant quantitities of heat by the vaporization of such materials. In this modification, however, the rate of addition must be adjusted so as not be contribute to any entrainment of the material being used in the product. The liquid may be inert or reactive toward the material being crystallized, depending on whether more crystallization and solidification is intended, or whether a reaction within the AFC is intended.

Agitator impact, per se, within the AFC apparatus does not directly provide the shear to disperse the liquid material. Instead, it has been found that the agitator functions in the following manner:

1. The agitator moves the solid bed particles to create shear.
2. The agitator moves the bed particles to disperse the liquid product feed.
3. The agitator moves the bed particles to prevent agglomeration of the mass.
4. The agitator homogenizes the bed to permit uniform distribution of feed and uniform heat transfer by causing intimate contact with the cooling and fluidizing gas.
5. The agitator provides dynamic bed formation such that solidified, cooled product overflows the AFC.
6. The agitator breaks down the bed particles into small seed particles which subsquently become coated with liquid feed and develop into product particles.

By dispersing the liquid material via the shearing action of the fluidized particles within the bed, the fluidized particles are coated with dispersed liquid material. At the same time, there is provided a continually replenished bed of fluidized particles by virtue of both the shearing forces within the bed and particle collisions with the agitator blade which continually break down some of the solid particles into yet smaller particles which thereby become seed material for subsequent product.

It is critical to the operation of the apparatus and for the operability of the process that there is a disengaging spaced under the agitator blade and above the bed support. The pitch of the agitator blades pushes the bed particles down towards the plenum baffle and bed support. There must be room for such flow. An uplifting motion of the blades is effective since the shearing action and dynamics of the bed are lost and the uplifting motion reduces the bed pressure drop allowing channelling and vortexing. It has been determined that the disengaging space should be in an approximate ratio of from about 1:3 to about 1:5, dependent on the relationship of the depth of the bed to the distance from the bed support to the agitator blade. In particular, a ratio of 1:4 has been found suitable. For example, if the bed depth is 50 cm., the disengaging space would preferably be about 12.5 cm.

Achieving good bed formation is a prime objective of the process. The bed formation is a fine balance of feed flow rate, fluidizing gas flow rate, particle size, bed temperature, agitator speed and the relative geometry of the bed and plenum baffles. As a means of achieving good bed formation, the first priority is to establish an optimum agitator speed.

The optimum agitator speed is determined by visual observation of the bed fluidization. In general, however, a maximum tip speed of the axial flow turbine blade is from about 350 meters/minute to about 450 meters/minute. Obviously if the agitator speed is too slow, no fluidization will occur and this will be observed visually. The agitator speed is then increased to the point of optimum fluidization.

Again, the rate of shearing of the particles within the bed is a function of agitator speed. The rate of shearing means the rate at which the bed particles are broken down or chipped into small seed particles. These seed particles are the new creation of bed particles which, with time, are coated by a melt a sufficient number of times that it becomes a product particle. Accordingly, a retention time in the bed is a critical factor. The longer any one particle remains in the bed at a constant feed rate, the more times it is coated and, consequently, the larger it grows. Additionally, with a large bed, the turnover is reduced such that any one particle is broken down by the agitator less times and the rate of growth is increased. Thus, the optimum agitator speed insures a good rate of breakdown of the particles.

Once the optimum agitator speed is established as set forth above, the gas flow rate must be adjusted to do two things: First, it must be high enough to fluidize the bed, but no so high that the air will channel causing the bed to vortex. Secondly, it must be adjusted to provide adequate heat transfer in the bed. As stated hereinbefore, with specific regard to DCHP, the system operates best with a 4° C to 19° C. air temperature rise and with an air flow rate which is conductive to good bed formation qualifies. This flow rate, with regard to DCHP, is approximately 59–90 meters per minute, more particularly, from about 52 meters/minute to about 85 meters/minute, the preferable average fluidizing velocity being from about 55 meters/minute to about 65 meters/minute, most particularly about 60 meters per minute. It is understood that the optimum fluidizing gas flow rate is a function of the material being fluidized and the particular fluidizing gas which is used. As is well known, all materials have different optimum fluidizing velocities.

The optimum average bulk operating temperature of the bed, with regard to DCHP, is between about 38° C. to 56° C., most preferably from about 42° C. to about 52° C. to yield good bed formation and particle size control. As for materials other than DCHP, the optimum operating temperature is usually that temperature at which maximum crystallization occurs. It is understood that materials which crystallize, including those which supercool, demonstrate varying rates of crystallization at different temperatures. Ideally the average bulk, temperature of the bed is controlled at the temperature of maximum rate of crystallization.

The particle size of the product is dependent upon a number of operating parameters. The two most significant of these parameters are operating temperature of the bed and the speed of the agitator blades. The faster the agitator blades revolve, the faster the particles within the bed are broken down. Also, the warmer the bed operates, the softer are the particles within the bed allowing them to be broken down more readily. The ambient temperature of the incoming fluidizing gas also effects the operation of the bed. To control the bulk temperature of the bed, the option described above, i.e. the use of a heat-transfer material having a high vapor pressure (i.e. having capcity to absorb large quantities of heat), may be utilized. The amount of material thus added is necessarily only very minimal and need be used only as a means to control the average bulk temperature of the bed during operation. The pellets, upon formation with the AFC, achieve an optimum size, with regard to DCHP, of between 0.3 cm. and 0.6 cm. in diameter. However under certain operating conditions, for example, if the bed temperature is too low, particle size may increase from 0.6 cm. to 1.6 cm. in diameter or greater at constant feed rate. Accordingly, it is believed that the bed temperature is the ultimate critical point for proper operation of the process. As stated above, the bed temperature may be easily controlled by the introduction of a heat absorbing material having a high vapor pressure. This material may be introduced simultaneously with the fluidizing gas.

The depth of the fluidized DCHP bed within the AFC should be equal to about one half the diameter of the vessel, i.e. a ratio of between about 1:1.5 to about 1:3, preferably approximtely a ratio of about 2:5. The bed depth is adjusted by the level of the product outlet where the product overflows the vessel via an orifice in a wall thereof. Depending upon the height of the outlet, the AFC apparatus serves to empty itself of product, since as new particles are formed within the dynamic bed, the level of the bed rises and the product overflows the side of the vessel.

If the product particles are insufficiently fine for certain uses, the product may be transferred to a mill or grinding operation for further reduction in size.

The DCHP as it emerges from the AFC is in a much harder crystalline structure than that which is normally produced by merely pouring the liquid material into a vat and allowing it to harden and thereafter breaking it up and grinding it. The harder crystalline structure of material produced by the process of this invention is attributable to the rapid shearing and cooling of the process. In previous methods the molten or liquid material was allowed to solidify from 2 to 7 days in containers such that a normal lattice crystal structure was achieved. The particles produced by the present invention are, however, in a more strained configuration but crystallography studies show that the product's physical properties remain unchanged.

The Apparatus

A preferred apparatus useful for conducting the process described above is set forth in detail as follows:

According to FIG. 1, the liquid or molten feed material, e.g. DCHP, is held in a storage tank 1 which may include heating and temperature control means to maintain the temperature of the feed material at maximum product product stability. This is accomplished, for example, with a hydraulic bulb in tank 1 which controls the steam supply to panel coils which may be mounted on the outside of the tank. A thermocouple in the tank registers the bulk molten temperature on a temperature recorder. The level of liquid product inventory in tank 1 is indicated continuously by the use of, for example, an extended diaphragm level transmitter in product storage tank 1. As the liquid or molten feed material is pumped from storage tank 1 by pump 2 it is introduced into the agitated fluidized crystallizer (AFC) 3 via melt flow control means 4 and inlet 5. Additionally, AFC vessel 3 has inlet 6 for introduction of inert heat transfer liquid and inlet 7 for introduction of fluidizing gas via blower 8. As the liquid or melted feed material flows into AFC vessel 3 via inlet 5, it contacts the fluidized bed of particles 9 whereupon it is dispersed and coats a portion of the particles within the bed 9. The bed 9 is fluidized by the combined action of the fluidizing gas which enters a inlet 7, the agitator 10 and agitator glade 11. The action of the agitator blade and a fluidizing gas keeps the bed of solid particles in fluid suspension. The action of the particles within the bed produces sufficient shear to break a portion of the particles into a smaller size thereby contributing seed particles for subsequent coating and removal as product.

Figure 2:
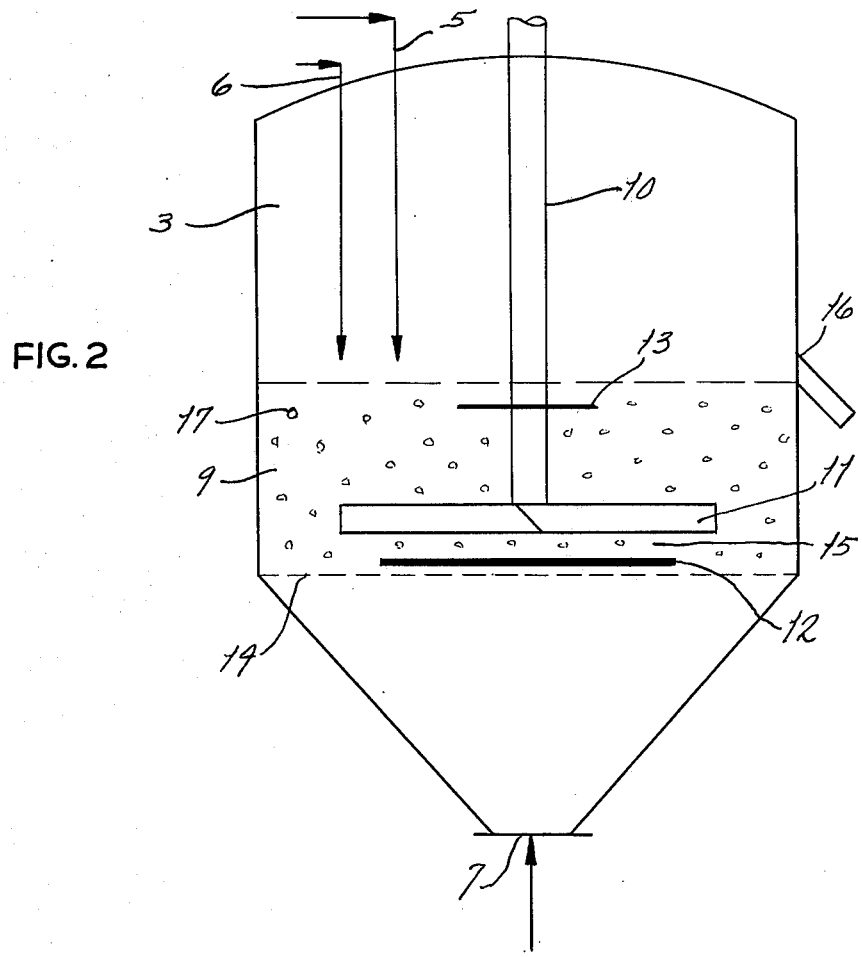
FIG. 2 is a detailed vertical section of the AFC in which the liquid material is dispersed and crystallized.

Now referring to FIG. 2, the direction of flow of the fluidizing gas is directed by means of plenum baffle 12 and bed baffle 13. The purpose of baffles 12 and 13 is to direct the flow of fluidizing gas to the wall of the AFC vessel 3 thereby eliminating vortexing around the agitator shaft 10. The fluidized bed is supported on air plenum screen 14 though which fluidizing gas is blown. The gas plenum screen 14 is designed to exert minimum air flow resistance and yet retain all bed particles so that none can be lost through the screen. The plenum baffle 12 is preferably a disc having a diameter one-half the vessel diameter (i.e. a relationship of from 7:15 to 2:3 with regard to the diameter of the vessel) which baffles incoming gas to the circumference of the AFC vessel 3. This baffling prevents channelling of the air through the center of the bed and around the agitator shaft 10. The agitator blade 11 is designed for a specific L/D ratio, such that there will be no dead space in the bed, i.e. such that the entire bed is in motion under agitation, including the material at the circumference of the AFC vessel 3. The bed baffle 13 is attached to the driving shaft 10 of the agitator. The bed baffle 13 is attached above the agitator blade 11 and serves to disperse any gas which does channel through the bed and up agitator shaft 10 despite the existance of the plenum baffle 2. The bed baffle 13 is located so as to be subsurface from the solids level of the bed 9. Usually, the placement of the bed baffle is calculated in a ratio of 1:10 as regards DCHP. Thus, a bed depth of 25 cm. would dictate placement of the bed baffle 2.5 cm. below the surface of the bed.

In general, a ratio of from about 1:5 to about 1:10 is practicable in calculating the proper location of the bed baffle with relation to the solids level of the bed.

The diameter of the bed baffle should have a relationship of about 1:3 to about 1:2 with regard to the diameter of the vessel. For DCHP, a suitable ratio is 2:5. This is to allow for a lip of solids at the circumference of the bed baffle 13 during operation which provides additional bed depth to prevent spouting in the bed. Between the agitator blade 11 and plenum baffle 12 there is a disengaging space 15. The pitch of the agitator blade 11 pushes the bed particles 17 down toward plenum baffle 12 and the gas plenum screen 14. The disengaging space 15 us to allow the critical need for flow room between the agitator blade 11 and plenum baffle 12. As stated above, with regard to the process, an uplifting motion of the blades is ineffective since the shearing action and dynamics of the bed are thereby lost. As dispersion and coating of the particles 17 by the liquid feed progresses, some of the particles 17 are broken into smaller particles which are subsequently coated by the incoming liquid feed. As the new particles are formed the level of the bed rises and the product particles overflow from AFC vessel 3 via product outlet 16. The product particles may be directed to a grinder 18 for further size reduction if desired.

The process and apparatus of this invention are illutrated more fully by the following examples:

EXAMPLE 1

The appartus consists of an 11.4 liter AFC vessel (22.9 cm. in diameter by 25.4 cm. in height) the bottom of which contains a fine mesh wire screen as a bed support. A 15.2 cm. diameter disc is attached as a plenum baffle to baffle the fluidizing gas to the circumference of the vessel to ensure positive movement of the solids upwards at the circumference and to eliminate channelling of the air in the fluidized agitated bed. Fluidized cooled ambient air is blown through a 7.6 cm. diameter inlet at the bottom of the vessel via a squirrel cage air blower. A 15.2 cm. diameter 3 bladed axial flow turbine extends into the AFC vessel via a vertical shaft with 3.8 cm. clearance between the bottom of the blade and the phenum baffle. The turbine is driven by a ½ horsepower variable speed (300 to 1600 rpm) motor. The turbine is driven in a direction to cause the pitch of the turbine blades to force the solids down against the phenum baffle and to the circumference of the vessel to be fluidized and cooled. A product outlet (2.54 cm. by 1.9 cm.) is positioned in the vessel wall for product discharge at 10.12 cm. elevation from the gas plenunm screen. The vessel is charged with 2 kg. of dicyclohexyl phthalate particles of average particle size of 0.32 cm. diameter.

Molten dicyclohexyl phthalate at 80° C (M.P., 64° C.) is pumped into the agitated fluidized bed from a heated storage container through a flow control valve. The melt is admitted onto the bed at a point of maximum bed turbulence (about 3.8 cm. from the axis of the vessel and agitator shaft) and 90° from the product discharge point in the direction of blade rotation. The system is found to operate ideally at a rotor speed of 840 rpm and a molten product feed of 0.16 kg. per minute. The cooling fluidized air flow is estimated to be about 2.82 cubic meters per minute.

The 840 rpm speed yeilds uniform product pellets of 0.3 cm. to 0.5 cm. in diameter.

The unit is operated for 3 and ½ hours. Forty-five kg. of particulate dicyclohexyl phthalate are produced.

EXAMPLE 2

Crystallization of Dicyclohexyl Phthalate

The apparatus consists of a 114 liter AFC vessel containing a wire grid bed support. A 23 cm. phenum baffle and a 15 cm. bed baffle are used. A 25 cm. diameter axial flow turbine blade is used which is powered by a 3 horsepower, variable speed motor.

The AFC is prechanged with 19 kg. of DCHP particles from bench production. Production rate is 136 kg./hr. The unit is operated on a semi-continuous basis and produces a total of 5,400 kg. of DCHP.

Similarly, diphenyl phthalate is prepared as described above without any significant change in parameters.

EXAMPLE 3

This example illustrates the preparation of crystalline dicyclohexyl phthalate by the process and apparatus of the invention at a production rate of 1350 kg. per hour.

The apparatus consists of an AFC vessel to which was pumped molten DCHP at 82° C. at a rate of 20.9 liters per minute from a steam coiled tank. The AFC was precharged with 861 kg. of DCHP particles which had been produced by pilot scale. The particle size of the precharged material was 0.32 to 0.95 cm. in diameter. The depth of the original was 61 cm.

Air is blown through the bed at the rate of 99 cubic meters/min. at 18° C. ambient temperature. The effluent air is ducted to the outside.

The melt feed to the AFC is flow-controlled at about 19.8 liters/min. for a production rate of 22.7 kg. per minute.

The apparatus is operated for 5.8 operating hours producting a total amount of 7,300 kg. of product.

EXAMPLE 4

Crystallization of Dicyclohexyl Phthalate

Apparatus similar to that used in Example 3 is again used but certain parameters of the process are varied. In this example, the agitator blade and the phenum baffle are adjusted to operations of a 35.6 cm. bed depth.

The process is started at a melt flow rate of 13.6 kg. per minute. After ½ hour of operation the flow rate is increased to 22.7 kg. per minute. A product uniformly 0.32 cm. to 0.6 cm. in diameter results. Bed formation is adequate. The operations are satisfactory and under steady state, the bed temperature leveling off at 53° C. The product run is terminated after producing 5,500 kg. of solid product.

While the invention has been described hereinabove with regard to certain illustrative specific embodiments, it is not so limited since many modifications and variations are possible in the light of the above teachings. It is understood therefore that the invention may be practiced otherwise than as specifically described without departing from the spirit and scope in the invention.

What is claimed is:

1. Process for solidifying and crystallizing liquid material which comprises
   a. feeding liquid material into solidification and crystallization means; whereby
   b. said material contacts an agitated, fluidized bed of solid particles of said material; thereby
   c. dispersing said liquid material within said bed while removing heat of crystallization from said liquid material; thereby
   d. causing said fluidized particles to become coated with said dispersed liquid material;
   e. providing a continually replenished bed of fluidized particles by the action of shearing forces within said bed; and
   f. allowing the level of said bed to rise as new particles are formed; and
   g. collecting solidified, crystallized product by allowing coated particles to overflow said solidification and crystallization chamber.

2. Process of claim 1 wherein said material is an ester of dicarboxylic acid.

3. Process of claim 2 wherein said acid is an aromatic acid.

4. Process of claim 2 wherein said acid is phthalic acid.

5. Process of claim 2 wherein said ester is a dicycloalkyl ester.

6. Process of claim 2 wherein said ester is a diaryl ester.

7. Process of claim 5 wherein said ester is dicyclohexyl phthalate.

8. Process of claim 6 wherein said ester is diphenyl phthalate.

9. Process of claim 1 wherein said material is a thermoplastic polymer.

10. Process of claim 9 wherein said polymer is a polyolefin.

11. Process of claim 10 wherein said polyolefin is polyethylene.

12. Process of claim 1 wherein said fluidization is accomplished and heat of crystallization of said liquid material is removed by contacting said material with a fluidizing gas having a temperature lower than said material.

13. Process of claim 12 wherein said material is contacted with said gas at the periphery of said bed, said gas being vertically directed through said bed.

14. Process of claim 12 wherein said gas is air.

15. Process of claim 12 wherein said gas is an inert gas.

16. Process of claim 15 wherein said gas is nitrogen.

17. Process of claim 16 wherein said gas is carbon dioxide.

18. Process of claim 12 wherein the initial temperature of said gas is ambient temperature or below.

19. Process of claim 18 wherein the maximum temperature rise of said gas is from 4° C. to about 19° C.

20. Process of claim 19 wherein said maximum temperature rise is from about 7° C. to about 15° C.

21. Process of claim 2 wherein said maximum temperature rise is from about 10° C. to about 130° C.

22. Process of claim 12 wherein said gas is removed from said solidification and crystallization means after reaching said maximum temperature.

23. Process of claim 22 wherein said gas is cooled and reintroduced to said solidification and crystallization means.

24. Process of claim 12 wherein said liquid material is concurrently contacted with an inert heat transfer agent having a high vapor pressure.

25. Process of claim 24 wherein said agent is water.

26. Process of claim 24 wherein said agent is solid carbon dioxide.

27. Process of claim 24 wherein said agent is liquid carbon dioxide.

28. Process of claim 24 wherein said agent is liquid nitrogen.

29. Process of claim 24 wherein said agent is a fluorinated hydrocarbon.

30. Process of claim 24 wherein said agent is an organic solvent.

31. Process of claim 12 wherein the average flow rate of said gas is from about 48 to about 90 meters per minute.

32. Process of claim 31 wherein said flow rate is from about 55 to about 65 meters per minute.

* * * * *

UNITED STATES PATENT OFFICE
CERTIFICATE OF CORRECTION

PATENT NO. : 4,022,820
DATED : May 10, 1977
INVENTOR(S) : Anders A. Johnson

It is certified that error appears in the above-identified patent and that said Letters Patent are hereby corrected as shown below:

Claim 2, line 2, insert --- a --- between "of" and "dicarboxylic".

Claim 17, line 1, "16" should be --- 15 ---.

Claim 19, line 2, insert --- about --- between "from" and "4°C.".

Claim 21, last word "130°C." should be --- 13°C. ---.

Signed and Sealed this nineteenth Day of July 1977

[SEAL]

Attest:

RUTH C. MASON
Attesting Officer

C. MARSHALL DANN
Commissioner of Patents and Trademarks